Jan. 2, 1968 D. A. HARRIS 3,361,352

OSCILLATING SPRAY DEVICES AND PROCESS OF USING SAME

Filed Sept. 4, 1964 4 Sheets-Sheet 1

INVENTOR
DAVID ALLAN HARRIS

By Cushman, Darby & Cushman
ATTORNEYS

INVENTOR
DAVID ALLAN HARRIS
By
Cushman, Darby & Cushman
ATTORNEYS

Jan. 2, 1968 D. A. HARRIS 3,361,352

OSCILLATING SPRAY DEVICES AND PROCESS OF USING SAME

Filed Sept. 4, 1964 4 Sheets-Sheet 3

Jan. 2, 1968 D. A. HARRIS 3,361,352

OSCILLATING SPRAY DEVICES AND PROCESS OF USING SAME

Filed Sept. 4, 1964 4 Sheets-Sheet 4

INVENTOR
DAVID ALLAN HARRIS

By Cushman, Darby & Cushman
ATTORNEYS

United States Patent Office 3,361,352
Patented Jan. 2, 1968

3,361,352
OSCILLATING SPRAY DEVICES AND PROCESS OF USING SAME
David Alan Harris, Haslemere, England, assignor to Imperial Chemical Industries Limited, Millbank, England, a corporation of Great Britain
Filed Sept. 4, 1964, Ser. No. 394,539
Claims priority, application Great Britain, Sept. 6, 1963, 35,307/63
20 Claims. (Cl. 239—4)

This invention relates to an improved liquid distributing device and to methods of treating vegetation and land with liquids.

Modern methods of agriculture and horticulture require the application of many biologically active substances to growing vegetation, either to kill the vegetation if it consists of weeds, or to kill harmful pests which live on the vegetation or in the ground. In many cases the substances are solid and the most convenient way of using them is to convert them into a suitable liquid formulation which is then applied by means of a spray device or machine. In order to avoid unnecessary expense water is generally employed for dispersing the substance and the resultant formulation usually consists of an aqueous solution, dispersion, or emulsion of the substance depending upon whether or not the substance is soluble in water and the nature of other ingredients of the formulation which are generally employed to ensure that the formulation remains adequately homogenous during the spraying operation.

The use of sprays is attended by a number of problems. Very often areas of vegetation to be treated may be large and either inadequately provided with or devoid of suitable roads or paths. As a consequence considerable difficulties and expense are involved in transporting large volumes of spray liquid to their site of application. Also in many areas water is difficult to obtain, and in many spraying operations the time taken to travel to and from the source of water is a major cost factor and hence there is a need to reduce as much as possible the frequency of replenishment filling. In order to facilitate spraying operations various means have devised to enable the volume of water in the spray liquid to be maintained as low as possible, commensurate with the distribution of sufficient quantities of active substance. This has been accomplished by spray devices which atomise the liquid into very small droplets, i.e., having average sizes of 10 to 150 microns which are ejected from specially designed nozzles with considerable force. By means of these devices sufficient active substance may be applied using as little as 5 gallons per acre whereas 15 to 20 gallons per acre is a common application rate. These spray devices suffer from a number of disadvantages. For example, because the size of the majority of droplets is so small the droplets tend to be carried in air streams, and to drift considerable distances from the point of application before they settle on a surface. As a result such devices cannot be used satisfactorily for the application, for example, of herbicides to weeds growing in proximity to crops or other vegetation of economic importance. The second disadvantage is that considerable pressures are required, i.e., from 30 to 60 lbs. per square inch, to force the spray liquid through the atomising nozzles and therefore pressurizing equipment is necessary. This usually comprises a pump and suitable source of power to operate it and generally both the pump and the machine producing the power are carried with the tank of liquid. With small machines of the kind which are portable the pump may be operated manually. In any event spray devices which atomise liquids tend to be somewhat expensive and heavy.

In order to overcome the problem of drifting droplets various liquid applicators have been devised which may conveniently be regarded as adaptions of various forms of water irrigators. These devices are provided with distributors having orifices from which liquid issues as continuous streams which may break up into coarse droplets at some distance from the orifices. In certain of these devices the distributors may be made to move so as to distribute the liquid more evenly over the ground. A major disadvantage of these devices is that they consume large quantities of liquid, e.g., from 400 to 600 gallons per acre. Furthermore, thorough and uniform wetting of the ground is not readily achieved if attempts are made to reduce the amounts of liquid to any substantial extent. Also vehicles on which the devices may be mounted have to move very slowly.

In co-pending patent application No. 29,244/61 reference is made to a discovery that when a distributor of a spray device is vibrated rapidly liquid emerging from orifices in the distributor falls to the ground as drops which are sufficiently large as not to result in any substantial spray drift. The specification describes a device which incorporates one or more distributor tubes which are caused to vibrate longitudinally at high frequency, for example, within a range of 500 to 2,000 vibrations per minute. When liquid issues from the orifices it does not, as might be supposed, become shattered into clouds of fine drifting droplets by the violent action of the tubes, but instead it forms large drops which, as indicated above, have little tendency to drift. This device has achieved a considerable measure of success in weed control. Not only has the device enabled liquid herbicide to be applied with great economy with regard to the amount of liquid used, but in addition it has permitted efficient weed control to be effected in areas in the immediate vicinity to growing crops without damage to them. The device nevertheless has certain limitations. It is a fairly large piece of equipment which is carried by a vehicle, usually a tractor. Consequently this device is not very suitable for use in areas which are accessible, but with difficulty, by vehicles. Furthermore the size of the device has imposed certain practical limitations on the forms of construction which enable the distributor to be vibrated at high speeds for long periods and this is of some importance because within certain limits the efficiency of the device is raised as the vibrational frequency of the tubes is increased. It has now been discovered, however, that very small, portable, liquid distributing devices are obtainable if they incorporate a distributor which oscillates rapidly in one or more curved paths.

According to the present invention therefore we provide a liquid distributing device comprising a distributor provided with one or more orifices having a diameter of at least 0.006 inch and means for oscillating the distributor in a curved path at a frequency such that a spray of substantially non-drifting liquid dorplets is produced.

For a better understanding of the inveniton and to show how the same may be carried into effect, reference will now be made, by way of example, to the accompanying drawings in which.

Figures 1, 2:
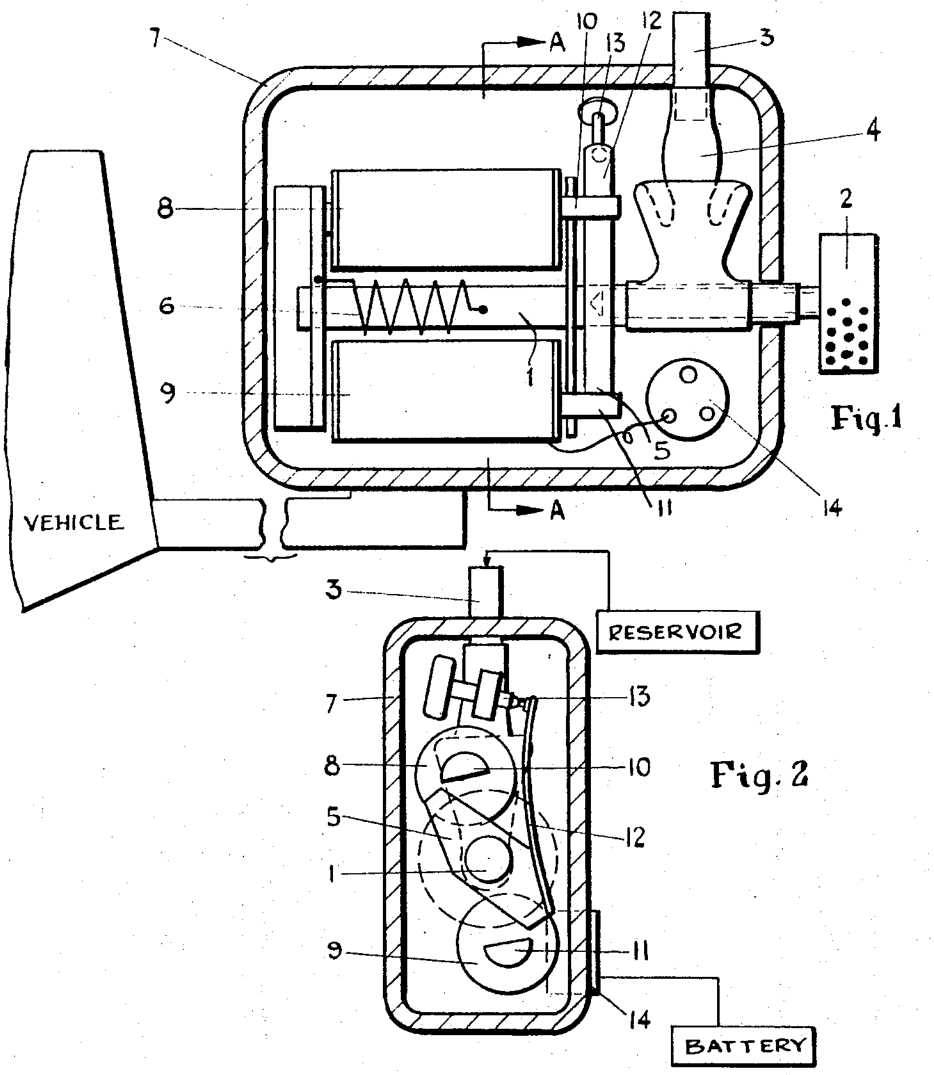
FIGURE 1 represents a partially-sectioned elevation of one form of a liquid distributing device.
FIGURE 2 is a partial section end view taken along the line AA of FIGURE 1.

The liquid distributing device illustrated in FIGURES 1 and 2 incorporates a distributor which is made to oscillate by electromagnetic means. This device incorporates a hollow shaft 1 which carries a distributor 2 at one extremity. The distributor is of cylindrical shape and has a diameter of 1 inch. Holes having a diameter of 0.025 inch are drilled radially through the cylindrical wall and are spaced apart sufficiently to reduce the risk of liquid emerging from the holes running together to form streams. Liquid is supplied to the distributor by an inlet pipe 3 which is connected to the shaft by a fluid tight bellows 4 which is very light and flexible so that when the shaft rotates as described below the bellows impose the minimum of resistance onto its movements. The shaft is supported in two plain bearings so that it is free to rotate about its longitudinal axis and carries a ferrous armature 5 which is especially shaped for maximum magnetic efficiency. The shaft also carries a torsion spring 6 wound helically one end of which is fixed to the shaft and the other is fixed to a base plate in an outer waterproof case 7. Two coils, 8 and 9 each with a D-shaped pole piece 10 and 11 at one end are placed on each side of the shaft. There is fixed to the armature 5 a spring blade 12 of conducting material with a contact point at its extreme end. The blade contacts a fixed point 13 mounted on a screw adjustor. The blade and the fixed contact are arranged so that no sliding takes place between the two contacts. The whole assembly is contained within the waterproof case 7 which is provided with a socket 14 for an electrical connection, an inlet pipe 3 for the supply of liquid and an opening for the hollow shaft.

When the current of electricity is not flowing the components are in the rest position in which the armature is separated from the pole pieces by the maximum distance. The torsion spring holds the armature in this position and the contacts are closed. When the current is switched on the coils become energised with the result that the armature is attracted magnetically to the pole pieces. As the armature moves it rotates the shaft on which it is mounted and this in turn rotates the distributor to which it is connected. After about 10° of rotation the contacts are opened and the flow of current is broken. Since the movement of the armature from the rest position takes place against the constraining influences of the torsion spring breaking of the current allows the spring to rotate the shaft bearing the armature in the reverse direction until it returns to its rest position. This movement causes the distributor to move to the same extent. When the rest position has been reached electrical contact is again made and a new cycle of movement begins once again.

Figure 3:
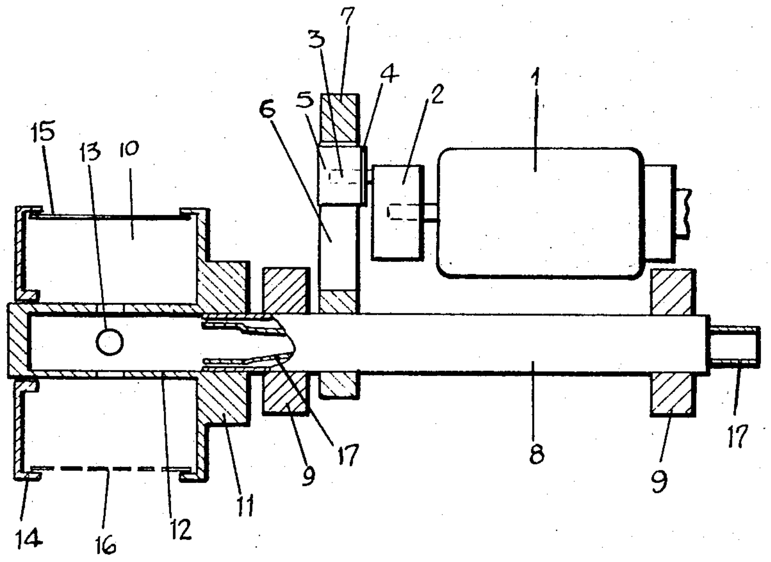
FIGURES 3, 4 and 6 represent alternative forms of liquid distributing devices.

The liquid distrubting device illustrated, as a side elevation in FIGURE 3, incorporates a distributor which is made to oscillate by electro-mechanical means, the power derived from a continuously rotating member being converted, by a crank arrangement, into an oscillatory movement which is transmitted to the distributor. A small electric motor 1 is connected to a crank 2 bearing a crank pin 3. The crank pin carries a flange 4 and extends into a recess in a slide block 5 against which the flange 4 makes sliding abutment. The slide block 5 is housed slidably within a recess 6 of a lever arm 7 which is connected to a hollow drive shaft 8 rotating within two bearings 9. When the motor is switched on it causes rotation of the crank pin 3 and the slide block 5 moves up and down, within the recess of the lever arm 7 which is thus caused to move rapidly from side to side. This oscillatory movement of the arm is transmitted by the drive shaft 8 to the distributor 10.

The distributor 10 may be formed as a single one-piece moulding (not shown), but preferably comprises a number of parts which can be taken apart and assembled readily to facilitate cleaning. A distributor body 11 is connected integrally to a hollow spindle 12 provided with apertures 13. The spindle supports a removable end cap 14. Between the distributor body 11 and the end cap 14 there is a removable cylindrical insert 15 and this insert is provided with liquid discharge orifices 16 having a diameter of 0.025 inch, in that part of it which faces to the ground when the spray device is in its normal operative position. When the device is in use liquid passes by means of a flexible feed pipe 17 into the hollow spindle 12 of the distributor and thence via apertures 13 into the main vessel portion of the distributor. Finally the liquid issues from the orifices as droplets having an average diameter of at least 800 microns. The device is capable of operating for long periods at oscillation frequencies which may be adjusted over a wide range. In general, however, the best results are usually obtainable at frequencies within the range of 2,000 to 6,000 cycles per minute.

Figure 4:
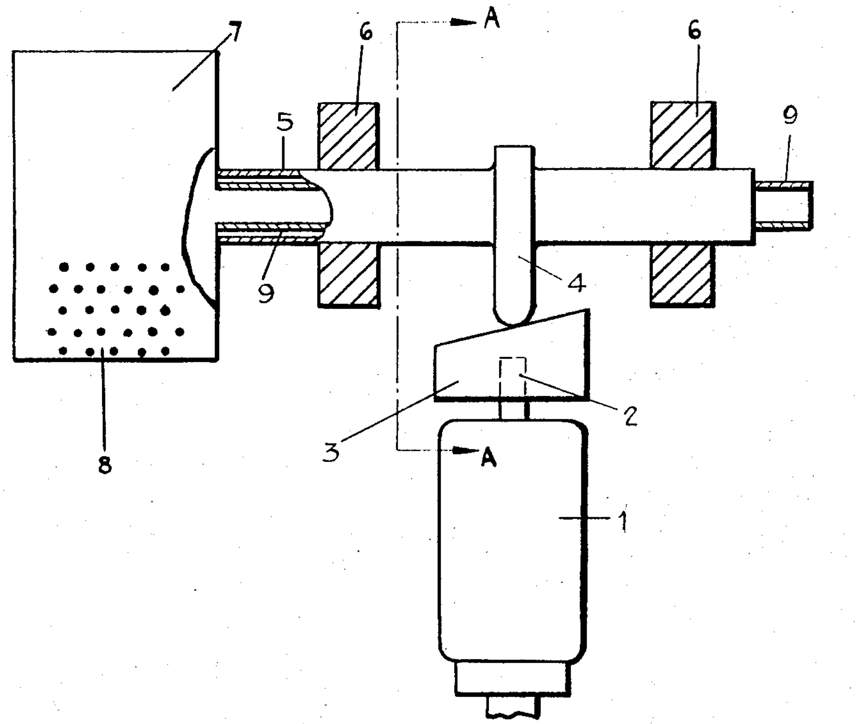

FIGURE 4 illustrates an especially simple form of device in which a distributor has imparted to it oscillatory motion by means of an electric motor operating in conjunction with a cam arrangement.

In this figure an electric motor 1 transmits rotary motion by a spindle 2 to a cam 3 which consists of a solid wedged shaped member formed of a mixture of nylon and molybdenum sulphide. The cam makes contact with a cam follower 4 connected integrally with a hollow drive shaft 5 which rotates in a bearing 6. The cam follower and the hollow shaft are also made of the same nylon/molybdenum sulphide mixture and constitute a single moulding. The drive shaft supports a distributor 7 provided with orifices 8 having a diameter of 0.025 inch.

Figure 5:
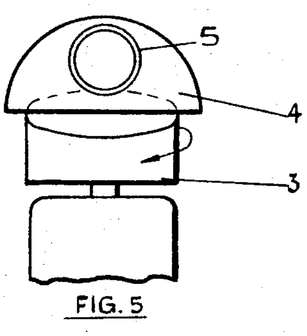
FIGURE 5 represents an elevation view taken along the line AA of FIGURE 4.

The relationship between the cam 3 and the cam follower 4 is shown more clearly in FIGURE 5 which is a side elevation taken along line AA. As the motor 1 imparts continuous rotation to the cam 3 the follower 4 is caused to oscillate and this oscillatory movement is transmitted by means of the drive shaft 5 to the distributor 7. Liquid is supplied to the distributor by a flexible tube 9 which passes through the hollow shaft and makes connection with the distributor which, because of the simplicity of construction of the device, can be made to oscillate at high frequencies for prolonged periods.

The efficiency of the devices described, i.e., the capacity which they possess for distributing liquid in the form of non-drifting droplets onto surfaces with the greatest economy in the amount of liquid used is dependant, to an important extent, on the frequency of oscillation of the distributor. As this is increased the efficiency of the device is raised and therefore it is preferable to employ high frequencies. However if the frequencies are too high there is a tendency for the drops of liquid to become shattered into smaller droplets which are liable to drift. The optimum frequency of a particular device depends to a certain extent upon its design. In general, however, good results are usually obtainable using oscillation frequencies within a range of 800 to 10,000 cycles per minute, although frequencies within a range of 2,000 to 6,000 cycles per minute are to be preferred.

An especially important advantage of these devices is that they enable liquid to be applied with great uniformity and with use of as little as 10 to 25 gallons per acre. As indicated above known spray devices which apply liquids in non-drifting condition often utilise as much as 600 gallons per acre to ensure uniformity of application.

The devices of the invention are capable of considerable modification. Thus the distributor may be a separate device or alternatively it may comprise no more than an extension of a hollow shaft which has had the necessary holes formed into its wall surface. Since high oscillational frequencies are desired the inertia of the distributor and of other moving parts should be kept as low as possible. Although distributors made of metal give very good results those made of light thermoplastic or thermosetting resins, for example, nylon, polystyrene, polyvinyl chloride and polypropylene are particularly suitable. For convenience detachable distributors are preferred since they are then easily replaced in the event of blockage or a different spray pattern being required.

The holes may be formed into the walls of the distributor by any suitable means, for example by drilling or moulding. Alternatively individual nozzles may be secured to the distributor. The holes should have diameters which are preferably not less than 0.006 inch and will be generally in the range of 0.010 to 0.062 inch. The best results have been obtained using diameters of 0.020 to 0.040 inch. The preferred arrangement of the holes will depend in some measure upon the amplitude of oscillation and the size of the distributor. For example, if the distributor is cylindrical and has a diameter of 1 inch the holes may preferably be arranged in staggered rows in such a way that holes within the rows are separated by about 10° of arc, but by virtue of the staggering will be separated by about 2.5° to 5.0° of arc from its nearest neighbour. Whatever spacing is adopted it is desirable that the holes should be close together, but not so close that liquid emerging from them coalesces to form streams.

A further advantage of the invention is that very efficient applications of liquid may be effected with very low pressures and this results in simplification of construction and lighter equipment. Thus very good results can be obtained using a pressure of only 0.5 lb. per square inch, although in general pressures in the range of 1 to 4 lbs. per square inch are preferred. Higher pressures, for example 4 to 12 lbs. per square inch may be used if a wide swath is to be sprayed. Even higher pressures may also be used, although there may be no great advantage in doing so. A further feature of the invention resides in the fact that at these low pressures the area over which a distributor is able to apply liquid uniformly is influenced greatly by small changes in pressure without influencing the rate of application of the liquid to any great extent. For example, it has been found that a cylindrical distributor of 1 inch diameter provided with holes having a diameter of .025 inch and oscillating with a frequency of 1,500 cycles per minute can be made to apply a drift free spray over a swathe having a width of either 12 inches or 24 inches at pressures up to 1 lb. per square inch at substantially the same application rate of 25 gallons of liquid per acre. This capacity to adjust the swath width by small variations in pressure rather than by changing the distributor for one having a different pattern of holes is of special value where weeds growing between rows of crops are to be treated, and the distance between the rows undergoes variation. It is also possible to change the swath width by varying the amplitude of oscillation. In general, however, very large variations in amplitude are not easily achieved and there is little advantage in doing so when the width of the swath can be altered readily by the other methods.

Figure 7:
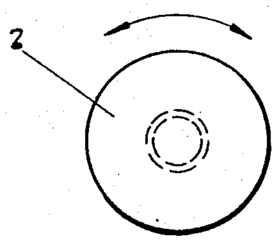
FIGURES 7 and 8 represent elevation views of alternaitve forms of distributor.

Certain shapes of distributors and dispositions of holes are more satisfactory if the width of the swath is to be varied by alteration of pressure. In general if a distributor is to be used for this purpose a substantial proportion of its surface should preferably be provided with holes. Thus the cylindrical distributor illustrated in FIGURE 7 is provided with holes over half the cylindrical wall and is specially suitable for this purpose.

Figure 8:
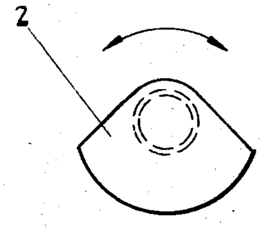

When the width of the swath is not required to be altered the distributor illustrated in FIGURE 8 may be used.

Figure 6:
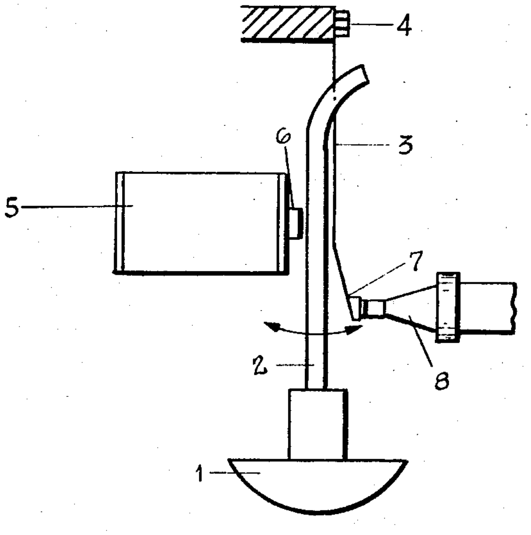

The oscillation of the distributor may take place about an axis extending through the distributor itself or about an axis disposed externally to it. For most purposes the former is preferred because distribution devices incorporating distributors moving in this fashion may be made much more lightly and utilise much higher oscillational frequencies. A device which incorporates the distributor oscillating about an axis external to itself is illustrated in FIGURE 6. In this figure a distributor 1 is connected to an inlet tube 2 which is either ferromagnetic or bears a ferromagnetic member. The tube 2 is connected to a spring blade 3 which is clamped at its upper end 4. A coil 5 is provided with a core 6. The lower end of the spring blade terminates in an electrical point 7 which is capable of making contact with an opposing point 8. Points 7 and 8 comprise an electrical make-and-break and forms part of an electrical circuit which includes the coil. Before the coil is activated by passage of electricity the inlet tube with attached distributor are in a rest position with the points 7 and 8 in contact. When the current is switched on the inlet tube is drawn towards the core during which operation the two points become separated thus breaking the flow of current and causing the core to become demagnetised. As a result of this the spring blade causes the inlet tube to move back into the rest position and the two points make contact once again to complete the electrical circuit and permit a new movement or oscillation of the inlet tube and hence of the distributor to take place. During the oscillation of the distributor liquid is fed into it preferably under low pressure through the inlet tube and emerges from the holes as coarse droplets having an average size greater than 300 microns.

It will be appreciated that while this invention is directed preferably to liquid distributing devices which incorporate electrical means to oscillate the distributor the invention is not so limited. Thus any means may be used provided it is capable of making the distributor to oscillate in a curved path. Alternative means include the use of compressed air or liquid under pressure whilst other mechanical means are also envisaged. The amplitude of oscillation of the distributor may vary according to the nature of the oscillation, i.e., according to whether the oscillation is about an internal or external axis or point of movement relative to the distributor. As a general rule since high oscillational frequencies are desired the amplitudes of the oscillations should be small. Thus with distributors oscillating about an internal axis or point of movement the amplitudes may be in the range of 5° to 30° of arc. Somewhat larger amplitudes may have to be employed when oscillation is about an external axis or point.

The distribution devices of the invention may include one or more oscillating distributors. Portable devices which are hand held and supplied with liquid from a tank which may be strapped to the back of an operator usually incorporates a single distributor. However for larger devices which are to be mounted on a vehicle up to six or even more distributors may be employed suitably mounted for example on a boom which may extend from one or more sides of the vehicle. A particular advantage of the present distributing devices is that they can be very light and as a consequence very little power is required to operate them. Thus a portable device with a single distributor of 2 to 5 watts may function for 20 hours with the aid of no more than two ordinary lantern batteries of 6 volts each, connected in parallel. With the larger vehicle mounted devices a total of 15 to 30 watts at 12 volts may be required depending upon the construction and number of the distributors. In any event the amount of power required is very small and is easily supplied by most forms of vehicle.

It will be appreciated that whilst this invention is directed primarily to devices for applying liquid herbicide it is not so limited. Thus the devices may also be used for applying other liquids, for example liquid compositions containing fertilizers, insecticides and other pesticides.

Whilst the present invention is directed primarily to a new liquid distributor a device s also new which comprises a shaft capable of supporting a distributor provided with one or more liquid discharge orifices said shaft being of hollow construction over at least part of its length so as to constitute means for supplying liquid to the distributor when it is mounted upon the shaft and electrical means to oscillate the shaft about its longitudinal axis with a frequency in the range of 800 to 10,000 cycles per minute. Preferably the hollow part of the shaft accommodates a flexible tube to convey liquid to the distributor.

What I claim is:

1. A liquid distributing device comprising a distributor provided with one or more liquid discharge orifices having a diameter of at least 0.006 inch and means for oscillating the distributor in a curved path at a frequency of at least 800 cycles per minute so that a spray of substantially non-drifting liquid droplets is produced.

2. A device according to claim 1 wherein said oscillating means oscillates the distributor at a frequency within a range of 800 to 10,000 cycles per minute.

3. A device according to claim 2 wherein said oscillating means oscillates the distributor at a frequency within a range of 2,000 to 6,000 cycles per minute.

4. A device according to claim 1 wherein the orifices of the distributor have a diameter within a range of 0.010 to 0.062 inch.

5. A device according to claim 4 wherein the orifices of the distributor have a diameter within a range of 0.020 to 0.040 inch.

6. A device according to claim 1 wherein the distributor is capable of oscillations having an amplitude within a range of 5° to 30° of arc.

7. A device according to claim 1 wherein the distributor is mounted on a shaft which is of hollow construction over at least part of its length, said shaft constituting means for supplying liquid to the distributor.

8. A device according to claim 7 wherein liquid is supplied to the distributor by means of a flexible tube accommodated within the hollow part of the shaft.

9. A device according to claim 1 wherein the distributor is oscillated by electrical means.

10. A device according to claim 9 wherein the electrical means comprises an electric motor driving a crank, said crank imparting oscillatory motion to the distributor.

11. A device according to claim 9 wherein the electrical means comprises an electric motor and a cam arrangement, said cam arrangement communicating oscillatory motion to the distributor.

12. A device according to claim 9 wherein the distributor is oscillated by an electro-magnetic device.

13. A device according to claim 1 wherein the distributor is formed as a single, one-piece, moulding.

14. A device according to claim 1 wherein the distributor comprises a number of parts which can be dismantled to facilitate cleaning.

15. A liquid distributing unit comprising a spray device as claimed in claim 9, and including a source of electric power and a reservoir for liquid.

16. A liquid distributing unit as claimed in claim 15 wherein the source of electric power is a battery capable of producing or storing electricity.

17. A liquid distributing device according to claim 1 wherein said device is mounted on a vehicle.

18. A device comprising a shaft capable of supporting a distributor having one or more liquid discharge orifices, said shaft being of hollow construction over at least part of its length, said shaft constituting means for supplying liquid to the distributor and electrical means capable of oscillating the shaft in a curved path at a frequency in a range of 800 to 10,000 cycles per minute.

19. A device according to claim 18 wherein the shaft accommodates a flexible tube.

20. A process of distributing a liquid comprising supplying liquid to a distributor provided with one or more liquid discharge orifices having a diameter of at least 0.006 inch and oscillating the distributor in a curved path with a frequency in a range of 800 to 10,000 cycles per minute, the amplitude of said oscillations being in a range of 5° to 30° of arc.

References Cited

UNITED STATES PATENTS

| | | | |
|---|---|---|---|
| 1,441,411 | 1/1923 | Fahnestock | 239—7 |
| 2,405,857 | 8/1946 | Siever | 239—102 X |
| 2,450,599 | 10/1948 | Kloda | 239—224 |
| 2,571,069 | 10/1951 | Shearman | 239—2 |
| 2,621,967 | 12/1952 | Sorensen | 239—242 |
| 2,781,280 | 2/1957 | Miller | 239—242 |
| 2,980,338 | 4/1961 | Kozinski | 239—214 |
| 2,986,338 | 5/1961 | Foster | 239—224 X |
| 3,192,167 | 6/1965 | Ogawa et al. | 252—359 |

FOREIGN PATENTS

| | | |
|---|---|---|
| 1,332,340 | 6/1963 | France. |

M. HENSON WOOD, Jr., *Primary Examiner.*

R. S. STROBEL, VAN C. WILKS, *Assistant Examiners.*